US010062446B2

United States Patent
Huang

(10) Patent No.: US 10,062,446 B2
(45) Date of Patent: Aug. 28, 2018

(54) MEMORY ARCHITECTURE WITH ECC AND METHOD FOR OPERATING MEMORY WITH ECC

(71) Applicant: eMemory Technology Inc., Hsinchu (TW)

(72) Inventor: Po-Hao Huang, Hsinchu (TW)

(73) Assignee: eMemory Technology Inc., Hsinchu (TW)

( * ) Notice: Subject to any disclaimer, the term of this patent is extended or adjusted under 35 U.S.C. 154(b) by 0 days.

(21) Appl. No.: 15/394,821

(22) Filed: Dec. 30, 2016

(65) Prior Publication Data

US 2017/0206134 A1    Jul. 20, 2017

Related U.S. Application Data

(60) Provisional application No. 62/280,137, filed on Jan. 19, 2016.

(51) Int. Cl.
| | | |
|---|---|---|
| *G11C 17/18* | (2006.01) | |
| *G11C 17/16* | (2006.01) | |
| *G06F 12/14* | (2006.01) | |
| *H04L 9/32* | (2006.01) | |
| *G11C 29/00* | (2006.01) | |

(Continued)

(52) U.S. Cl.
CPC ............ *G11C 17/18* (2013.01); *G06F 3/064* (2013.01); *G06F 3/0619* (2013.01); *G06F 3/0673* (2013.01); *G06F 11/1076* (2013.01); *G06F 12/1408* (2013.01); *G06F 21/72* (2013.01); *G06F 21/73* (2013.01); *G11C 7/10* (2013.01); *G11C 7/22* (2013.01); *G11C 7/24* (2013.01); *G11C 16/0408* (2013.01); *G11C 16/08* (2013.01); *G11C 16/22* (2013.01); *G11C 16/24* (2013.01); *G11C 16/26* (2013.01); *G11C 16/32* (2013.01); *G11C 17/16* (2013.01); *G11C 29/785* (2013.01); *H03K 3/356113* (2013.01); *H04L 9/3278* (2013.01); *G06F 2212/1052* (2013.01); *G06F 2212/402* (2013.01); *G11C 5/063* (2013.01); *H01L 27/11206* (2013.01)

(58) Field of Classification Search
CPC .................................................... G06F 11/1076
USPC .................. 714/764, 763, 769, 42, 766, 767
See application file for complete search history.

(56) References Cited

U.S. PATENT DOCUMENTS

| | | | | |
|---|---|---|---|---|
| 8,593,855 B2 * | 11/2013 | Onishi | ................ | G06F 11/1048 365/148 |
| 2001/0052090 A1 * | 12/2001 | Mio | .................... | G06F 11/1008 714/42 |

(Continued)

OTHER PUBLICATIONS

Maddah et al., "Power of One Bit: Increasing Error Correction Capability with Data Inversion", 2013 IEEE 19th Pacific Rim International Symposium on Dependable Computing (PRDC), Dec. 2-4, 2013, pp. 1-10.

*Primary Examiner* — Fritz Alphonse
(74) *Attorney, Agent, or Firm* — JCIPRNET

(57) ABSTRACT

A circuit architecture for operating error-correction code (ECC) in a memory apparatus includes a control circuit and an ECC circuit. The ECC circuit is coupled with the control circuit. The control circuit receives a first data of a set of bits to invert the first data as an inverted data. The ECC circuit receives the inverted data for encryption or decryption and outputs an ECC-processed data. The control circuit inverts the ECC-processed data as a second data.

16 Claims, 4 Drawing Sheets

(51) Int. Cl.
    *G11C 16/22*     (2006.01)
    *G11C 7/24*      (2006.01)
    *G06F 21/73*     (2013.01)
    *G11C 16/04*     (2006.01)
    *G11C 16/08*     (2006.01)
    *G11C 16/24*     (2006.01)
    *G11C 16/26*     (2006.01)
    *G11C 16/32*     (2006.01)
    *G06F 3/06*      (2006.01)
    *G06F 11/10*     (2006.01)
    *G06F 21/72*     (2013.01)
    *H03K 3/356*     (2006.01)
    *G11C 7/10*      (2006.01)
    *G11C 7/22*      (2006.01)
    *G11C 5/06*      (2006.01)
    *H01L 27/112*    (2006.01)

(56) References Cited

U.S. PATENT DOCUMENTS

| | | | |
|---|---|---|---|
| 2011/0246857 A1 | 10/2011 | Bae et al. | |
| 2012/0266043 A1* | 10/2012 | Nakura | G11C 13/0007 714/763 |
| 2015/0006997 A1* | 1/2015 | Alam | G06F 11/1048 714/769 |
| 2015/0254136 A1* | 9/2015 | Hoya | G06F 11/1012 714/764 |

* cited by examiner

MEMORY ARCHITECTURE WITH ECC AND METHOD FOR OPERATING MEMORY WITH ECC

CROSS-REFERENCE TO RELATED APPLICATION

This application claims the priority benefit of U.S. provisional application Ser. No. 62/280,137, filed on Jan. 19, 2016. The entirety of the above-mentioned patent application is hereby incorporated by reference herein and made a part of this specification.

BACKGROUND OF THE INVENTION

1. Field of the Invention

The present invention generally relates to memory architecture, in particular, to memory architecture with error-correcting code (ECC) function.

2. Description of Related Art

As a basic structure for a memory apparatus, it includes memory array and various peripheral circuit to access the cells of the memory array. The memory array is the core part to store the data. However, the data stored in the memory array may have error, in which the data may have one bit flipped from what is originally written. To correct the error bit in the memory array, the ECC circuit is used when data is written-to or read-from the memory array, to detect the error bit based on parity check and then correct the error bit.

Various algorithms can be taken for the ECC circuit. However, in one of the algorithms based on checking the even number of "1" in the data set, such as 32 bits, the ECC circuit may change the initial data, when the cells of the memory array by default is "1", such as FFFF-FFFF, in which one word is composed of four bits and one F represents four bits of "1111".

The ECC causes the error for accessing the data of FFFF-FFFF is following. The ECC circuit in 32-bit I/O with 6 correction code (bit) is taken as an example. When the data of FFFF-FFFF in 32 bits is input to the ECC circuit for encryption, then the output after ECC encryption would be 38 bits in total and the value is 3F-FFFF-FFD8, which is combined with six bits of "01 1000" and then stored into the memory array. After then, the data of 3F-FFFF-FFD8 is read out from the memory array. Before the actual output, the data of 3F-FFFF-FFD8 enter the ECC circuit for decryption to remove the ECC and get the output data FFFF-FFFF in 32 bits. However, when a memory is just out of factory, the data read out from the memory array would be 3F-FFFF-FFFF but not 3F-FFFF-FFD8. It will cause the first-time read fail. This situation does particularly exist for the initial data of FFFF-FFFF.

How to effectively solve the issue above should be taken into account for designing the ECC circuit.

SUMMARY OF THE INVENTION

The invention has proposed a memory architecture with error-correcting code (ECC) function, wherein the ECC can remain its function but the data input to the ECC circuit is inverted and the data output from the ECC circuit is inverted also.

In an embodiment, the invention provides a memory architecture, having an error-correction code (ECC) function. The memory architecture comprises a memory array for storing data of bits. Further, an error-correcting code (ECC) circuit is used to encrypt and decrypt a passing data with ECC. A first control circuit is connected between the ECC circuit and the memory array. A second control circuit is connected between the ECC circuit and a data I/O side. When an input data from the I/O side is to be written into the memory array, the second control circuit inverts the input data before the input data enters the ECC circuit for encryption and the first control circuit inverts an output from the ECC circuit to write into the memory array. When an output data from the memory array is read, the output data is inverted by the first control circuit before entering the ECC circuit for decryption, and the second control circuit inverts an output from the ECC circuit to treat as a read-out data.

In another embodiment, as to the memory architecture, the ECC circuit is a hamming code ECC circuit.

In another embodiment, as to the memory architecture, the input data comprises a set of bits, and the bits are divided into a plurality of groups, the groups are intersecting to each other, and the ECC circuit provides parity bits to correct each groups to have even number of data with "1".

In another embodiment, as to the memory architecture, the ECC circuit comprises an encryption circuit and a decryption circuit to respectively form an encryption path and a decryption path.

In another embodiment, as to the memory architecture, the first control circuit comprises a first inverter and a second inverter respectively in the encryption path and the decryption path, wherein the first inverter inverts the output from the ECC circuit to write into the memory array and the second inverter inverts the output data read from the memory array to enter the ECC circuit for decryption. Also, the second control circuit comprises a third inverter and a fourth inverter respectively in the encryption path and the decryption path, wherein the third inverter inverts the input data to enter the ECC circuit for encryption and the fourth inverter inverts the output from the ECC circuit after decryption to provide the read-out data.

In another embodiment, as to the memory architecture, the decryption path and the encryption path are multiplexed so that at least two of the first to fourth inverters share a same one of inverter.

In another embodiment, the invention provides an operation method on a memory apparatus, wherein the memory apparatus comprises a memory array, an error-correcting code (ECC) circuit, a first control circuit and a second control circuit, the ECC circuit is to encrypt and decrypt a passing data with ECC. The operating method comprises: connecting the first control circuit between the ECC circuit and the memory array; connecting the second control circuit between the ECC circuit and a data I/O side; performing a programming mode when an input data with a set of bits from the I/O side is written into the memory array, the second control circuit inverts the input data before the input data enters the ECC circuit for encryption and the first control circuit inverts an output from the ECC circuit to write into the memory array; and performing a reading mode when an output data is read from the memory array, the output data is inverted by the first control circuit before entering the ECC circuit for decryption, and the second control circuit invert an output from the ECC circuit to treat as a read-out data.

In another embodiment, as to the operation method, the ECC circuit is a hamming code ECC circuit to perform an encryption process and a decryption process.

In another embodiment, as to the operation method, the input data comprises a set of bits, and the bits are divided into a plurality of groups, the groups are intersecting to each other, and the ECC circuit provides parity bits to correct each groups to have even number of data with "1".

In another embodiment, as to the operation method, the method further comprises providing the ECC circuit having an encryption circuit and a decryption circuit to respectively form an encryption path and a decryption path.

In another embodiment, as to the operation method, the method further comprises: providing the first control circuit having a first inverter and a second inverter respectively in the encryption path and the decryption path, wherein the first inverter inverts the output from the ECC circuit to write into the memory array and the second inverter inverts the output data read from the memory array to enter the ECC circuit for decryption; and providing the second control circuit comprises a third inverter and a fourth inverter respectively in the encryption path and the decryption path, wherein the third inverter inverts the input data to enter the ECC circuit for encryption and the fourth inverter inverts the output from the ECC circuit after decryption to provide the read-out data.

In another embodiment, as to the operation method, the method further comprises multiplexing the decryption path and the encryption path to have at least two of the first to fourth inverters share a same one of inverter.

In another embodiment, the invention provides a method for operating error-correction code (ECC) in a memory apparatus. The method comprises: receiving an input data during a program mode; inverting the input data as a first inverted data by a control circuit; providing an ECC circuit to receive the first inverted data for encryption and output an encrypted data; inverting the encrypted data and writing to a memory array by the control circuit; using the control circuit to invert an output data read from the memory array to a second inverted data during a read mode; decrypting the second inverted data by the ECC circuit; and inverting the decrypted data as a read-out data by the control circuit.

In another embodiment, as to the method, the control circuit comprising a plurality of inverters with respect to encryption and decryption for inverting a passing data.

In another embodiment, the method further comprises multiplexing the decryption path and the encryption path to have at least two of the first to fourth inverters share a same one of inverter.

In another embodiment, as to the method, the input data comprises a set of bits, and the bits are divided into a plurality of groups, the groups are intersecting to each other, and the ECC circuit provides parity bits to correct each groups to have even number of data with "1".

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
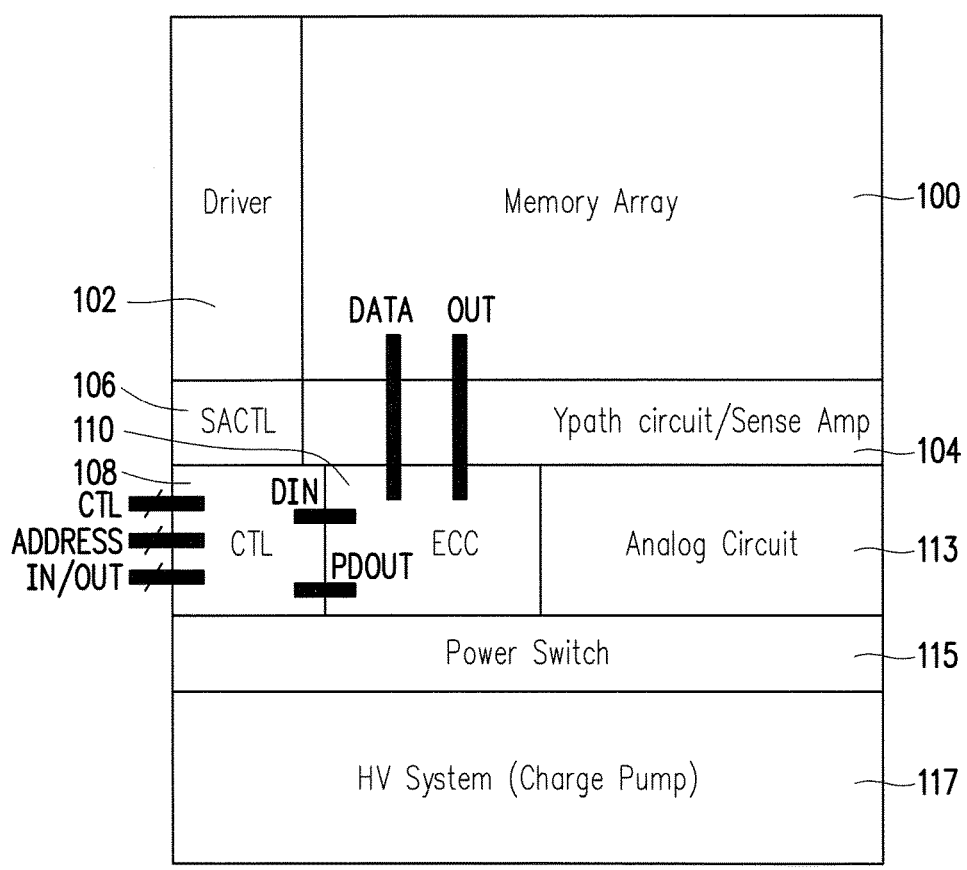
FIG. 1 a drawing, schematically illustrating a memory architecture, according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The invention has proposed an ECC operation, which can avoid an error of EEC particularly to accessing the initial data stored in the memory array. The ECC can remain its function but the data input to the ECC circuit is inverted and the data output from the ECC circuit is inverted also.

Several embodiments are provided for describing the invention but not for limiting the invention.

FIG. 1 a drawing, schematically illustrating a memory architecture, according to an embodiment of the invention. Referring to FIG. 1, the memory apparatus 50 usually includes a memory array 100 and various peripheral devices to control and access the memory array 100. The peripheral devices in an example may include a driver 102, a Ypath circuit/sense-amplifier 104, a sense-amplifier control circuit SACTL 106, an control CTL 108, an ECC circuit 110, an analog circuit 113, a power switch 115 and a high voltage (HV) system 117. Several terminates, such as the control bus, address bus, and the in/out (I/O) bus are provided for communicating with external host to access the memory array. The basic architecture and operation of the memory apparatus 50 can be known the art, the detail descriptions are not provided.

However, the invention is related to the operation of the ECC circuit 110. The following descriptions would concentrate on the function of the ECC circuit 110 as proposed by the invention.

The input data DIN to be written into the memory array 100 for storage would enter through the ECC circuit 110 first to encrypt with ECC, in which the ECC circuit 110 can generate correction code which can correct the error bits if the error bits occur in the data afterward. The ECC circuit 110 then output the data DATA to be actually written into the memory array 100 for storage. On the other way, when the output data OUT from the memory array 100 to be read out by the external host, the output data OUT would enter the ECC circuit 110 for decryption, and then output as the read-out data PDOUT.

Figure 2:
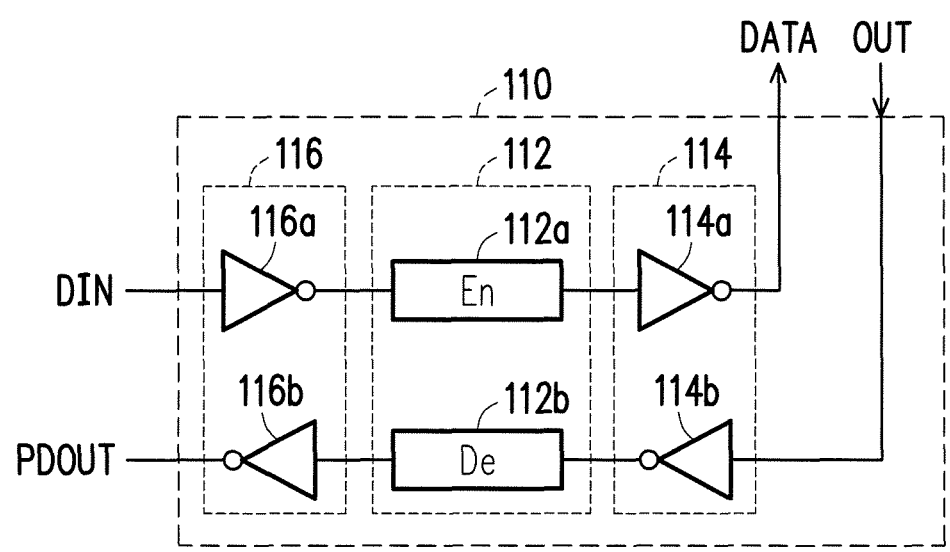
FIG. 2 is a drawing, schematically illustrating a circuit architecture for operating ECC, according to an embodiment of the invention.

The invention proposes the ECC circuit 110 with a modified structure so to avoid the error when the data is in a value of FFFF-FFFF. FIG. 2 is a drawing, schematically illustrating a circuit architecture for operating ECC, according to an embodiment of the invention.

Referring to FIG. 2, the ECC circuit 110 is the intermediate device between the I/O side and the memory array 100. The invention does not need to modify the original ECC circuit 112. However the invention adds a control circuit, which in an example for easily arrangement can include a first control circuit 114 and a second control circuit 116. The ECC circuit 112 can also divided into encryption path (En) 112*a* and the decryption path (De) 112*b*. As a result, the ECC circuit 110 as proposed by the invention has a first control circuit 114 connected between the ECC circuit 112 and the memory array 100 and a second control circuit 116 connected between the ECC circuit 112 and a data I/O side.

When an input data DIN from the I/O side is to be written into the memory array 100, the second control circuit 116 inverts the input data DIN before the input data DIN enters the ECC circuit 112 for encryption through the encryption path 112a and the first control inverter 114a inverts an output from the ECC circuit 112 as the data, denoted by DATA, to write into the memory array 100 by a write circuit in the Ypath circuit/sense-amplifier 104. When an output data as denoted by OUT from the memory array 100 is read by sense amplifier in the Ypath circuit/sense-amplifier 104, the output data OUT is inverted by the first control circuit 114 before entering the ECC circuit 112 for decryption through the decryption path 112b, and the second control circuit 116 inverts an output from the ECC circuit 112 to treat as a read-out data as denoted by PDOUT.

In better detail, the first control circuit 114 comprises a first inverter 114a and a second inverter 114b respectively in the encryption path 112a and the decryption path 112b, wherein the first inverter 114a inverts the output from the ECC circuit 112 to write into the memory array 100 and the second inverter 114b inverts the output data read from the memory array 100 to enter the ECC circuit 112 for decryption. On the other hand, the second control circuit 116 comprises a third inverter 116a and a fourth inverter 116b respectively in the encryption path 112a and the decryption path 112b, wherein the third inverter 116a inverts the input data DIN to enter the ECC circuit 112 for encryption and the fourth inverter 116b inverts the output from the ECC circuit 112 after decryption to provide the read-out data PDOUT.

Figure 3:
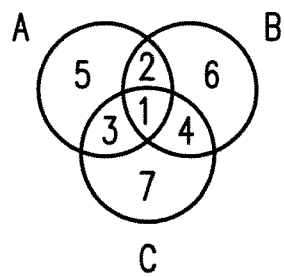
FIG. 3 is a drawing, schematically illustrating a mechanism for the ECC to generate the parity bits, according to an embodiment of the invention.
Figure 3:
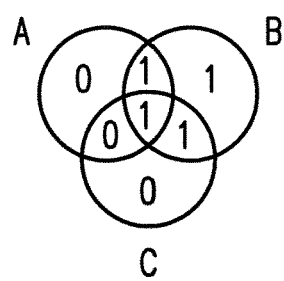

Before describing the effect of the ECC circuit 110 as proposed by the invention, an example for the ECC operation is provided. FIG. 3 is a drawing, schematically illustrating a mechanism for the ECC to generate the parity bits, according to an embodiment of the invention. Referring to FIG. 3, taking an example to transmit a data with a set of four bits, such 1101, and three bits, serving as the parity bits, are added. The 7 bits in total are transmitted, in which the 7 bits are coded by 1 to 7. The 7 bits are divided into three groups A, B, and C, as an example. The groups are intersecting each other by a relation as shown in left top. As a result, the valued for the code 1-7 is 1101010, in which the first four bits represent the data. In ECC encryption, each group has four bits and should satisfy an even number of "1".

Figure 4:
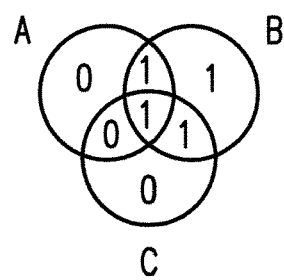
FIG. 4 is a drawing, schematically illustrating a mechanism for the ECC to correct the error bits, according to an embodiment of the invention.
Figure 4:
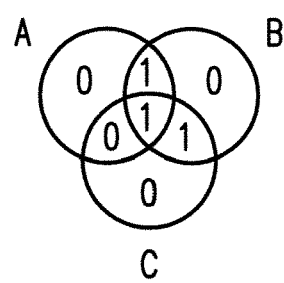

FIG. 4 is a drawing, schematically illustrating a mechanism for the ECC to correct the error bits, according to an embodiment of the invention. Referring to FIG. 4, the data of 1101010 is transmitted as should be the form in left top. However, the data stored in the memory array 100 may be 1101000. The ECC circuit 112, such as the (7,4) Hamming code circuit, can decryption the data of 1101000 into 1101010 because the group B has odd number of bit "1" and the parity bit at code 6 is corrected to 1. Here, the total length of the bits is 7 but only four bits are originally to be transmitted as operate by the (7, 4) Hamming code circuit.

Figure 5:
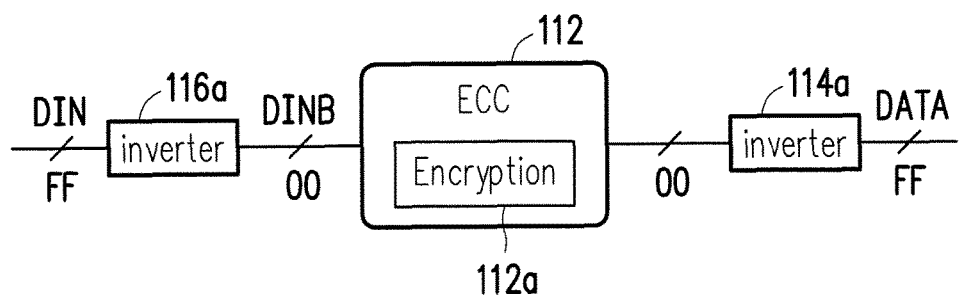
FIG. 5 is a drawing, schematically illustrating a mechanism for the ECC to operate encryption, according to an embodiment of the invention.

The following is describing the operation mechanism of the ECC circuit 110 as proposed in the invention. FIG. 5 is a drawing, schematically illustrating a mechanism for the ECC to operate encryption, according to an embodiment of the invention. Referring to FIG. 5, in a specific situation for encryption that all bits of the input data DIN happen to be all in "1", such as FFFF-FFFF in 32 bits. The inverter 116a inverts the data into invert-data DINB, which becomes 0000-0000 and then enters the EEC circuit 112 at the encryption path 112a. Because the data is 0, so it satisfies the even number of bits with "1". The parity bits would stay "0" as well, without adding bit "1". Then, the data in 38 bits of "0" is inverted again by the inverter 114a into 3F-FFFF-FFFF as the DATA to be written into the memory array 100.

Figure 6:
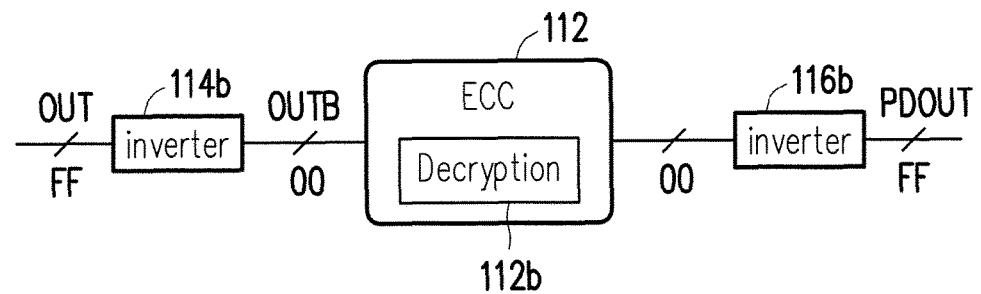
FIG. 6 is a drawing, schematically illustrating a mechanism for the ECC to operate decryption, according to an embodiment of the invention.

FIG. 6 is a drawing, schematically illustrating a mechanism for the ECC to operate decryption, according to an embodiment of the invention. Referring to FIG. 6, for the decryption when data is to be read out from the memory array 100. Then, all 38 bits of the output data OUT as read from the memory array 100 are "1", such as 3F-FFFF-FFFF. Again, the inverter 114b inverts the data OUT into data OUTB, which is then entered to the ECC circuit 112 at the decryption path 112b. Here, all bits of the data OUTB is "0", so the ECC circuit 112 does not change the data at all and all bits in "0" are output. Again, the inverter 116b is then inverts the bits in "0" as the bits in "1", as the read-out data PDOUT, which stay the original form of FFFF-FFFF while removing the ECC code.

Remarkably, several inverters are used for describing the mechanism. However, since the inverters are the same function. So, the inverters can share the same one of inverter. In other words, by a path arrangement and using multiplexers, the first and the third inverter can share the same one of inverter, and the second inverter and the fourth inverter can share the same one of inverter. Even, the first to fourth inverters can share the same one of inverter, in which the mechanism for path selection may be added. In other words, each of the encryption path 112a and the decryption path 112b has involved twice of inverting operations, in which the hardware arrangement is not necessary to be just limited to the embodiments as stated above.

The ECC circuit 110 can avoid the inconsistence of data for writing in and read out when the initial data is set to "1" for the bits. The ECC circuit 110 can also be compatible with other type of ECC circuit because the two times of inverting process do not change the result in other type of ECC.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory architecture, having an error-correction code (ECC) function, comprising:
    a memory array for storing data of bits;
    an error-correcting code (ECC) circuit, used to encrypt and decrypt a passing data with ECC;
    a first control circuit, connected between the ECC circuit and the memory array; and
    a second control circuit, connected between the ECC circuit and a data I/O side,
    wherein when an input data from the I/O side is to be written into the memory array, the second control circuit inverts the input data before the input data enters the ECC circuit for encryption and the first control circuit inverts an output from the ECC circuit to write into the memory array,
    wherein when an output data from the memory array is read, the output data is inverted by the first control circuit before entering the ECC circuit for decryption, and the second control circuit inverts an output from the ECC circuit to treat as a read-out data.

2. The memory architecture as recited in claim 1, wherein the ECC circuit is a hamming code ECC circuit.

3. The memory architecture as recited in claim 1, wherein the input data comprises a set of bits, and the bits are divided into a plurality of groups, the groups are intersecting to each other, and the ECC circuit provides parity bits to correct each groups to have even number of data with "1".

4. The memory architecture as recited in claim 1, wherein the ECC circuit comprises an encryption circuit and a decryption circuit to respectively form an encryption path and a decryption path.

5. The memory architecture as recited in claim 1,
wherein the first control circuit comprises a first inverter and a second inverter respectively in the encryption path and the decryption path, wherein the first inverter inverts the output from the ECC circuit to write into the memory array and the second inverter inverts the output data read from the memory array to enter the ECC circuit for decryption,
wherein the second control circuit comprises a third inverter and a fourth inverter respectively in the encryption path and the decryption path, wherein the third inverter inverts the input data to enter the ECC circuit for encryption and the fourth inverter inverts the output from the ECC circuit after decryption to provide the read-out data.

6. The memory architecture as recited in claim 5, wherein the decryption path and the encryption path are multiplexed so that at least two of the first to fourth inverters share a same one of inverter.

7. An operation method on a memory apparatus, wherein the memory apparatus comprises a memory may, an error-correcting code (ECC) circuit, a first control circuit and a second control circuit, the ECC circuit is to encrypt and decrypt a passing data with ECC, the operating method comprising:
connecting the first control circuit between the ECC circuit and the memory array;
connecting the second control circuit between the ECC circuit and a data I/O side;
inverting an input data by the second control circuit before the input data enters the ECC circuit for encryption and inverting an output from the ECC circuit by the first control circuit to write into the memory array when the input data with a set of bits from the I/O side is written into the memory array; and
inverting an output data by the first control circuit before entering the ECC circuit for decryption, and inverting an output from the ECC circuit by the second control circuit to treat as a read-out data when the output data is read from the memory array.

8. The operating method as recited in claim 7, wherein the ECC circuit is a hamming code ECC circuit to perform an encryption process and a decryption process.

9. The operating method as recited in claim 7, wherein the input data comprises a set of bits, and the bits are divided into a plurality of groups, the groups are intersecting to each other, and the ECC circuit provides parity bits to correct each groups to have even number of data with "1".

10. The operating method as recited in claim 7, also comprising providing the ECC circuit having an encryption circuit and a decryption circuit to respectively form an encryption path and a decryption path.

11. The operating method as recited in claim 7, also comprising:
providing the first control circuit having a first inverter and a second inverter respectively in the encryption path and the decryption path, wherein the first inverter inverts the output from the ECC circuit to write into the memory array and the second inverter inverts the output data read from the memory array to enter the ECC circuit for decryption; and
providing the second control circuit comprises a third inverter and a fourth inverter respectively in the encryption path and the decryption path, wherein the third inverter inverts the input data to enter the ECC circuit for encryption and the fourth inverter inverts the output from the ECC circuit after decryption to provide the read-out data.

12. The operating method as recited in claim 7, further multiplexing the decryption path and the encryption path to have at least two of the first to fourth inverters share a same one of inverter.

13. A method for operating error-correction code (ECC) in a memory apparatus, comprising:
receiving an input data during a program mode;
inverting the input data by a control circuit as a first inverted data;
providing an ECC circuit to receive the first inverted data for encryption and output an encrypted data;
inverting the encrypted data by the control circuit and writing to a memory array by the control circuit;
using the control circuit to invert an output data read from the memory array to a second inverted data during a read mode;
decrypting the second inverted data by the ECC circuit; and
inverting the decrypted data by the control circuit as a read-out data.

14. The method for operating ECC as recited in claim 13, wherein the control circuit comprising a plurality of inverters with respect to encryption and decryption for inverting a passing data.

15. The method for operating ECC as recited in claim 14, further multiplexing the decryption path and the encryption path to have at least two of the first to fourth inverters share a same one of inverter.

16. The operating method as recited in claim 13, wherein the input data comprises a set of bits, and the bits are divided into a plurality of groups, the groups are intersecting to each other, and the ECC circuit provides parity bits to correct each of the groups to have even number of data with "1".

* * * * *